US005498486A

United States Patent [19]
Gatehouse

[11] Patent Number: 5,498,486
[45] Date of Patent: Mar. 12, 1996

[54] SECURITY BATTERIES FOR AUTOMOTIVE VEHICLES

[75] Inventor: Peter P. Gatehouse, Lancashire, Great Britain

[73] Assignee: B.I.G. Batteries Limited, Gwent, United Kingdom

[21] Appl. No.: 360,817
[22] PCT Filed: Jun. 25, 1993
[86] PCT No.: PCT/GB93/01345
 § 371 Date: Feb. 1, 1995
 § 102(e) Date: Feb. 1, 1995
[87] PCT Pub. No.: WO94/01894
 PCT Pub. Date: Jan. 20, 1994

[30] Foreign Application Priority Data

Jul. 1, 1992 [GB] United Kingdom .................... 9214014
Jan. 20, 1993 [GB] United Kingdom .................... 9301734

[51] Int. Cl.$^6$ ............................. H01M 2/06; H01M 2/30
[52] U.S. Cl. ................................ 429/7; 429/8; 429/150
[58] Field of Search ............................ 429/7, 8, 150, 429/178

[56] References Cited

U.S. PATENT DOCUMENTS 5,023,591 6/1991 Edwards .................................. 340/426

FOREIGN PATENT DOCUMENTS 2263012A 7/1993 United Kingdom .
WO89/12343 12/1989 WIPO .

*Primary Examiner*—Prince Willis, Jr.
*Assistant Examiner*—Richard H. Lilley, Jr.
*Attorney, Agent, or Firm*—Young & Thompson

[57] ABSTRACT

A battery has an exposed negative terminal (2), but the positive terminal (10) is hidden within the casing of the battery and instead only a dummy terminal (3) is visible. When the vehicle is parked, power is fed from the positive terminal (10) through an isolator relay (12) to an INHIBIT circuit (C). When power is made available through the ignition switch to a terminal (6), power is fed via a socket (4) to a keypad. A predetermined code has to be set into the keypad in order to pass an operating signal to an electronic lock (13), which is effective to switch the relay (12) to connect power to an ENABLE circuit (B) and to disconnect the supply from the INHIBIT circuit (C). This causes a solenoid (9) to operate for a time determined by a timer (14) so that the positive terminal (10) is connected to the dummy terminal (3) through a plunger (9A). When the ignition key is moved to the start position power is supplied through the starter lead connected from the terminal (3) to a starter motor. Consequently, the motor cannot normally be started unless the ignition sequence includes the keying in of the code into the keypad. Any attempt to bypass the ignition system or bump-start the car will result in sensing devices (15 or 19) opening switch contacts (18A) supplying power to the alternator via the terminal (5).

11 Claims, 2 Drawing Sheets

SECURITY BATTERIES FOR AUTOMOTIVE VEHICLES

FIELD OF THE INVENTION

It is well known that most motor vehicles are started by means of a starter motor, and an ignition spark where applicable. The power source for starting is usually provided by the starter battery contained in the vehicle. The battery can be switched in and out of circuit by an ignition switch operated by a key.

This system is however very poor in terms of security of the vehicle. A thief can use jump-leads to bypass the ignition switch to enable him to steal a vehicle quite easily, and this fact is confirmed by the enormous number of vehicle thefts each year. There is obviously a requirement for an immobiliser which will prevent vehicle theft by this means.

SUMMARY OF THE INVENTION

According to the present invention there is provided a starter battery for an automotive vehicle, the battery having the usual negative and positive terminals but incorporating a control circuit sealed within the battery, including a heavy duty switch between the positive terminal and a dummy terminal, the positive terminal being inaccessible from the exterior of the battery whilst the negative terminal and the dummy terminal are accessible from the exterior of the battery as terminal posts for connection to the starter motor of the vehicle, the control circuit having an input for connection to an external code-controlled operating device for controlling the enabling of said heavy duty switch.

Thus the battery has a built-in capability to make the positive terminal of the battery open-circuit. The battery appears to have the usual two main terminal posts (positive and negative) as in a conventional battery. One terminal post which is visible is in effect a dummy terminal and is normally open-circuit, but can be joined by the heavy duty switch within the body of the battery to the real positive terminal, which is hidden under the lid of the battery and is not accessible.

During the construction of the battery a tamper-proof screen (for example of metal, bullet-proof glass or other suitable material) may be built into the lid of the battery, such that when the lid is finally welded onto the battery main body, the screen is positioned in such a way that it prevents tampering with the heavy duty switch, the real positive terminal or the control circuit. This screen (if formed from an electrically-conductive material) could also be connected electrically to the main negative terminal post.

The main negative terminal post is also constructed in such a way that it can be connected electrically within the lid of the battery to the circuit board. The means by which it is connected should be such that it cannot easily be broken or cut, and a solid metal bar is a convenient member for this purpose.

Ideally, the positive terminal of the battery is connected through a switching device to an inhibit circuit having a switch-controlled output for connection to the starter motor solenoid of the vehicle and possibly to other electrically-operated parts of the vehicle, In this arrangement preferably the switch-controlled output comprises a normally-closed switch and a control device for changing the status of that switch upon receipt of a signal indicating an attempt to start the vehicle. This acts to prevent the electrical supply being made available to start the engine unless the external code-controlled operating device has been activated correctly.

The control device can take various forms. It is greatly preferred that the control circuit should be responsive to a particular effort to start a vehicle when the ignition sequence has not been properly performed by actuating the external code-controlled operating device. Thus the control circuit could incorporate a microphone to pick up the noise of the starter motor solenoid being activated. Another possibility is a trembler switch which will respond to any attempt to move the car or to vibration caused by attempts to start the car motor. In either case (or with some other form of device for sensing attempts to start the vehicle) sensing will inhibit the starting sequence for the vehicle.

Ideally, the heavy duty switch within the battery is fed from a timer which allows the heavy duty switch to be enabled only for a predetermined time interval. This reduces wear on the heavy duty switch as it is not held on at the time that the vehicle is in use. In the preferred arrangement the heavy duty switch will be in the form of a solenoid.

Preferably the code-controlled operating device will be a handset or panel with a keypad enabling a digital code to be entered. Ideally the digital code provides a predetermined PIN number for enabling the control circuit of the battery, so that each battery control system will have a relatively unique code. Advantageously, the handset or panel will carry operating lights for indicating the status of the control circuit.

If a tamper-proof screen is installed within the battery body and over the control circuit and the positive terminal, attempts to gain access to the positive terminal can be made very difficult if not impossible. The screen can be formed from an electrically-conductive material and be connected to the negative terminal of the battery.

BRIEF DESCRIPTION OF THE DRAWINGS

The apparatus of the invention may be constructed in various ways and a preferred embodiment will now be described, by way of example, with reference to the accompanying drawings, in which.

DESCRIPTION OF THE PREFERRED EMBODIMENT

Figure 1:
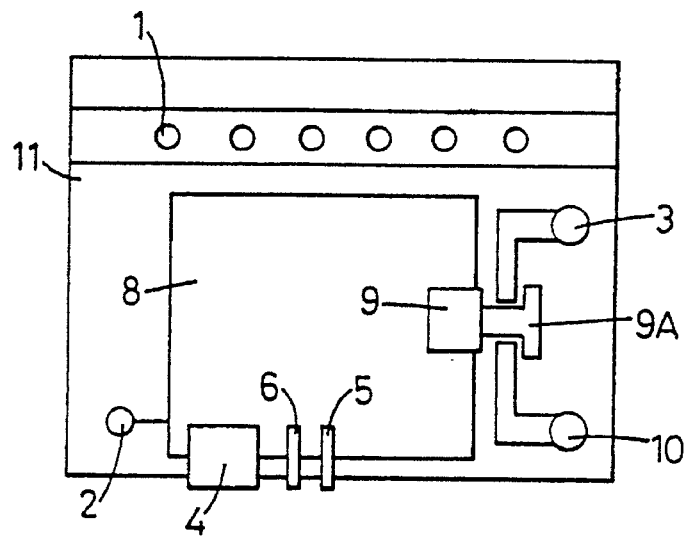
FIG. 1 shows a plan view of a battery of this invention before the lid has been welded on, giving an example of the layout of the components.

The battery shown in FIG. 1, prior to the lid being welded into place, shows various vent holes 1 and a normal plastic cover 11 welded over the body of the battery such that gas or liquid can only escape through the vent holes. This cover 11 also forms an effective barrier between the contents contained within the body of the battery and any components placed above the plastic cover. These components comprise a negative terminal post 2, a real positive terminal post 10 and a dummy terminal post 3. Terminal posts 3 and 10 are made in such a way that they form two metal conductors separated only by a narrow gap. An electronic circuit board 8 is positioned above the plastic cover 11 and has, attached to it, a socket 4 and two terminals 5 and 6 of similar form. Forming part of the circuit on the circuit board is a solenoid 9 for operating an arm 9A to close the gap between the metal conductors. The actual electronic circuits formed on the board are not shown in FIG. 1 but will be described later with reference to the block diagrams shown in FIG. 3.

Figure 2:
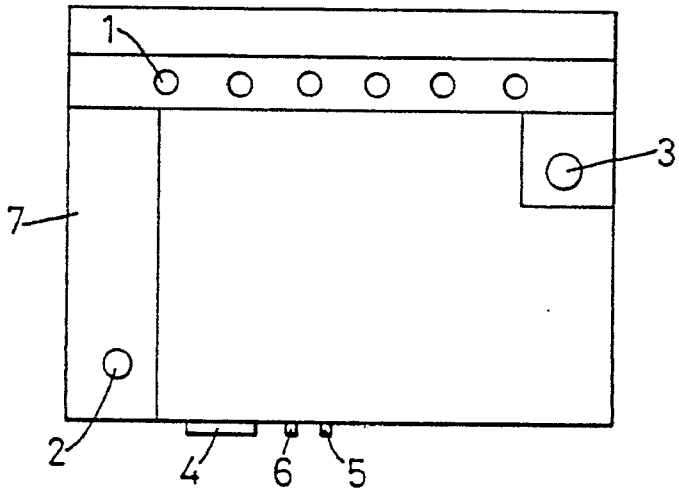
FIG. 2 shows an exterior plan view of the battery after the lid has been welded in position.

Referring to FIG. 2 it will be seen that when a lid 7 of the battery is finally welded into place, the only accessible features are the negative terminal post 2, the dummy terminal post 3, the socket 4 and the terminals 5 and 6.

Figure 4:
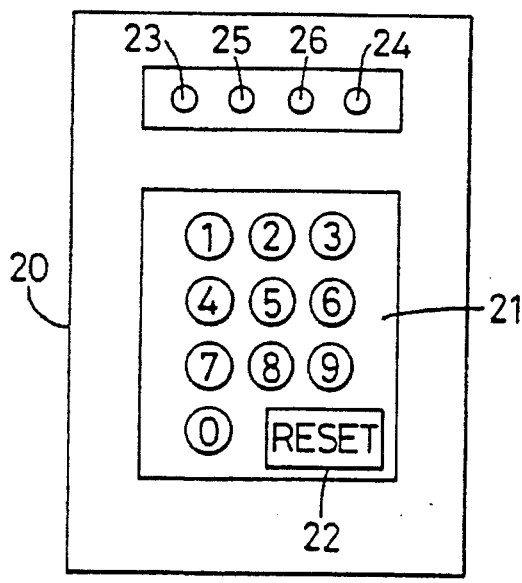
FIG. 4 illustrates a keypad to be used with the battery.

When the battery is installed in a vehicle the negative lead to the chassis is connected as normal to the negative terminal post 2. The heavy duty starter lead is connected to the dummy positive terminal post 3, but any other leads which are normally connected to the positive post in a conventional battery (e.g. the alternator lead) are now connected to the terminal 5. A lead is connected from the +12 v, DC terminal on the ignition coil to the terminal 6, and a plug with a multi lead cable attached is connected to the socket 4. The other end of this multi-lead cable is attached to a handset 20 (as shown in FIG. 4), positioned in the driver compartment in a convenient place such as on the dashboard. The handset allows the driver to start the vehicle and comprises a ten number keypad 21, a reset button 22, various operating lights 23 to 26 and a sound circuit.

Three operational procedures using the equipment of the invention will now be described by way of example and with reference to FIGS. 1 to 3 of the accompanying drawings, particularly FIG. 3, as follows:

1 The normal starting procedure

2 Attempting to start the vehicle using the starter motor, but not the authorised code signal 3. Attempting to push start the vehicle without using the authorised code signal.

Procedure 1

Inside the battery the electronic circuit board 8 is on standby until the normal ignition is switched on. In this state an isolator relay 12 of an ISOLATOR circuit A allows the 12 volt supply from the real positive terminal 10 to be distributed throughout an INHIBIT circuit C. There is at this stage no 12 volt supply to an ENABLE circuit B. Also the 12 volt supply is connected via line 27 to the red lights 23, 24 on the handset which flash alternately.

Once the motorist switches on the ignition, 12 volts is supplied via terminal 6 and socket 4 to the circuit of the handset 20, and this also causes the orange light 25 to glow. 12 volts is also supplied to an electronic lock 13 as part of the circuit A. The motorist can then enter a coded sequence of numbers into the handset keypad 21 which comprises four digits and must be in the correct sequence. Once the electronic lock has received the correctly coded signal (for that particular battery) it operates giving a signal to activate the isolator relay 12. When the relay energises, the 12 volt supply on pins 1 and 4 is switched from the normally closed contacts (pins 2 and 5) to the normally open contacts (pins 3 and 6), removing all power from the INHIBIT circuit C, and at the same time the relay 12 self-latches via its terminal 3. An output is also given to a timer 14 of the ENABLE circuit B which activates the solenoid 9 for a set time period (this can be varied). When the plunger 9A of the solenoid 9 pulls in, it acts as a switch to close the gap between the conductors, thus joining terminal 3 to terminal 10.

An output is also given to the handset 20 in the driver's compartment, via the output line 28, causing the green light 26 to illuminate. (There is now no supply to the red and orange lights 23, 24, 25). This signal tells the driver he can turn the ignition key to the final start position. Power is now available for the starter motor to turn via terminal 3 joined to terminal 10. Once the vehicle has started the switch 9A remains closed for only a short time then re-opens making terminal 3 once again open-circuit, and no distracting lights remain lit on the handset 20.

At the completion of the journey, as the ignition is switched off, it removes power from the isolator relay 12. The relay then changes state again, removing all power from the ISOLATOR circuit A and instead transferring power to the INHIBIT circuit C. The importance of this is that the system resets automatically and the motorist is not obliged to make any further contribution to securing the vehicle.

Procedure 2

If there is an attempt to start the vehicle without entering the authorised code sequence, but the ignition system is by-passed, the following sequence of events will take place.

Because power is available through closed contacts 18A of a switching device 18 to terminal 5, when power is applied to the starter motor solenoid, it will pull in. However, since no power is available from terminal 3, the starter motor will not turn. The action of the solenoid pulling in will make a noise and vibration which will travel back up the heavy duty starter lead to the battery via terminal 3. Inside the lid of the battery is a transducer (or microphone) 15 which senses the sound and vibration. Because the correct code has not been entered, the INHIBIT circuit C is powered. The received signal is amplified by an operational amplifier 16 and triggers a timer 17 which in turn activates the switching device 18 (which could be a relay or solenoid) controlling the terminal 5, for a predetermined time. As soon as the switching device 18 is energised it opens the normally closed contacts 18A and removes the full voltage output from terminal 5 for the predetermined time. This releases the starter motor solenoid and dims all dashboard lighting and ignition voltage for a short time, thus giving the appearance of a flat battery. A low value resistor 29 placed across the normally closed contacts 18A acts such that if the contacts open, this resistance is in series with the real positive terminal 10 of the battery and the output socket 5. Now a normal motor vehicle, in order to start, must draw a DC current from the battery to create the spark required to ignite the petrol. This current is in the order of 3 amps depending on the vehicle, but is not likely to be less than 2 amps for any vehicle. If a low value resistor (e.g. 15 ohms) were to be used in this context, assuming battery voltage to be 12 volts, the current limiting effect would be 0.8 amps which would mean that no vehicle would be able to start whilst relay 18A contacts were open.

Procedure 3

Faced with the result of Procedure 2, a determined thief may decide that so long as ignition voltage is available, it is possible to push-start the vehicle. The vehicle when pushed will trigger the transducer which will operate relay 18 and the contacts will open. This will limit the amount of current that can be drawn from the battery due to resistor 29 in series with the positive terminal 10, to about 0.8 amps. Even when the moving vehicle is put into gear it will not fire as there is not enough power available to create the necessary spark.

Figure 3:
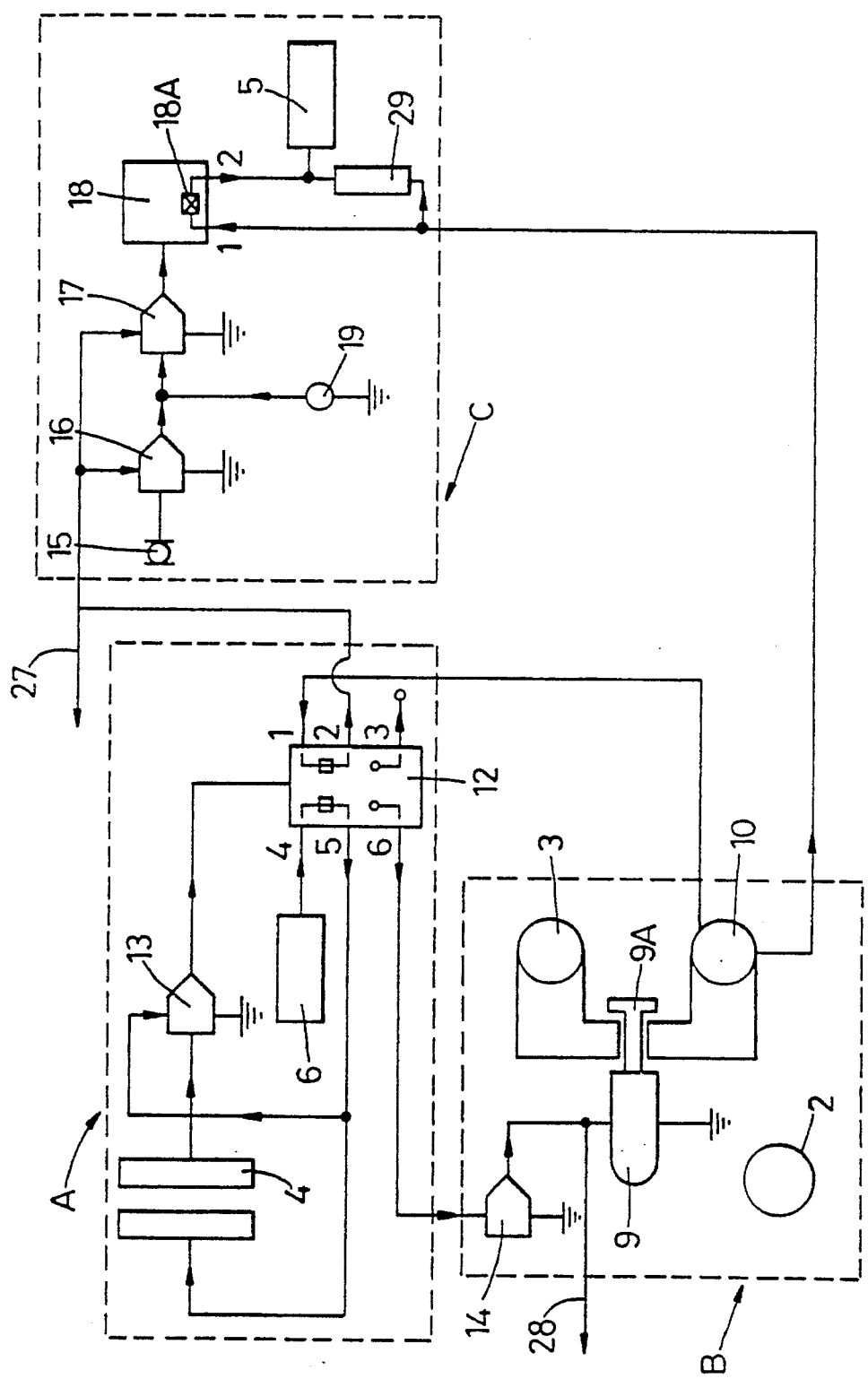
FIG. 3 illustrates, by means of schematic block diagrams, various electronic circuits incorporating the components of a control circuit for the battery on a circuit board.

Reference to FIG. 3 will show that although in the procedures 2 and 3 described above a transducer or microphone 15 is provided as a sensor, other sensors may be employed with similar results. Another possibility for the sensor is a jitter/trembler switch 19 which is extremely sensitive. The contacts of the switch 19 are normally open but will close momentarily if subjected to any shock, vibration or movement. This switch is arranged such that one contact is connected to the negative supply terminal 10 and the other contact to the trigger pin of the timer 17. If the contacts close for even a millisecond the timer will trigger and activate the switch 18.

If the vehicle should stall, for example, pressing the reset button 22 on the keypad within a few seconds is effective to retain the code set into the keypad so that reoperation of the ignition can be carried out without the need to re-enter the code. This saves time when the car needs to be restarted speedily after a stall.

Although individual components are mentioned, they are not fully illustrated in FIG. 3, but are described sufficiently so that any competent electronics engineer could build these circuits to achieve the required results in a variety of ways.

As a further refinement an additional sensor could be provided as a tilt or jitter switch attached to the rear edge of the car bonnet so that, if the bonnet is lifted the switch will be operated. The switch will be normally closed and connected to the battery via a small jack plug and socket. This switch will form part of a circuit which includes an additional timer device which will have an indefinite time delay and, when operated, will cause the relay contacts 18A to open. They will then stay open until the correct code is entered into the keypad to reset the additional timer device. Any attempt to put in a shorting link would be foiled since the additional timer will not respond. Also, cutting the lead from the tilt switch will merely lead to the open circuit condition, which triggers the additional timer. This further feature increases still further the protection against attempts to jump start the vehicle.

We claim:

1. A starter battery for an automotive vehicle, the battery having the usual negative and positive terminals but incorporating a control circuit sealed within the battery, including a heavy duty switch between the positive terminal and a dummy terminal, the positive terminal being inaccessible from the exterior of the battery whilst the negative terminal and the dummy terminal are accessible from the exterior of the battery as terminal posts for connection to the starter motor of the vehicle, the control circuit having an input for connection to an external code-controlled operating device for controlling the enabling of said heavy duty switch.

2. A starter battery according to claim 1, wherein the positive terminal is connected through a switching device to an inhibit circuit having a switch-controlled output member for connection to the starter motor solenoid of the vehicle.

3. A starter battery according to claim 2, wherein said switch-controlled output member comprises both a normally-closed switch and a control device for changing the status of that normally-closed switch upon receipt of a signal indicating an attempt to start the vehicle.

4. A starter battery according to claim 1, wherein said heavy duty switch is fed from a timer which allows the heavy duty switch to be enabled only for a time interval.

5. A starter battery according to claims 1, wherein the heavy duty switch is in the form of a solenoid.

6. A starter battery according to claim 1, wherein the code-controlled operating device is a handset or panel with a keypad enabling a digital code to be entered.

7. A starter battery according to claim 6, wherein the digital code provides a PIN number for enabling the control circuit of the battery.

8. A starter battery according to claim 6, wherein the handset or panel carries operating lights for indicating the status of the control circuit.

9. A starter battery according to claim 1, wherein a tamper-proof screen is installed within the battery body and over the control circuit and the positive terminal.

10. A starter battery according to claim 9, wherein the screen is formed from an electrically-conductive material and is connected to the negative terminal of the battery.

11. A starter battery according to claim 1, wherein the control circuit incorporates one of a microphone, a trembler switch and a sensing device for sensing attempts to start a vehicle and connected to inhibit the starting of the vehicle.

* * * * *